Mar. 13, 1923.
A. SENTELL.
TRAP.
FILED DEC. 15, 1921.
1,448,092.
3 SHEETS—SHEET 1.
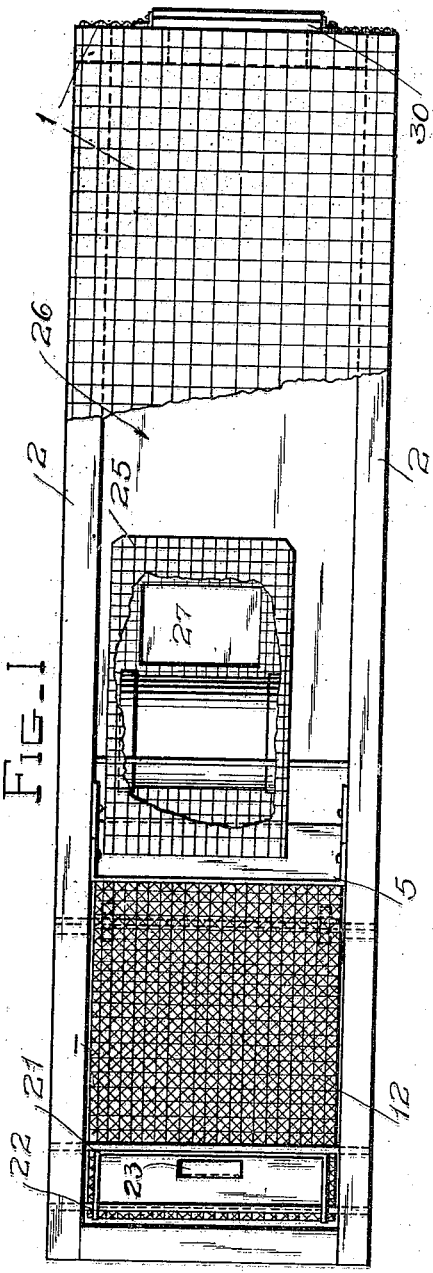
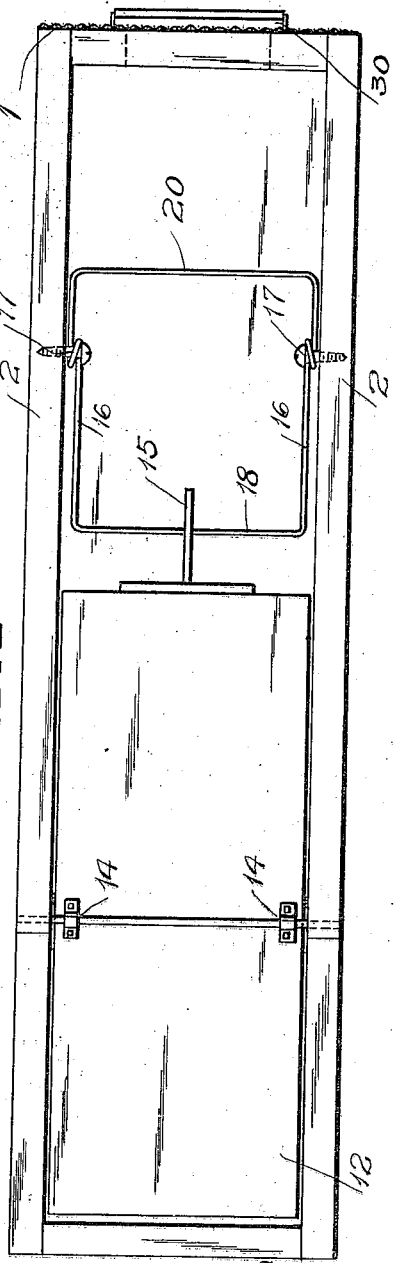
Inventor
A. Sentell
By H. B. Willson & Co.
Attorneys

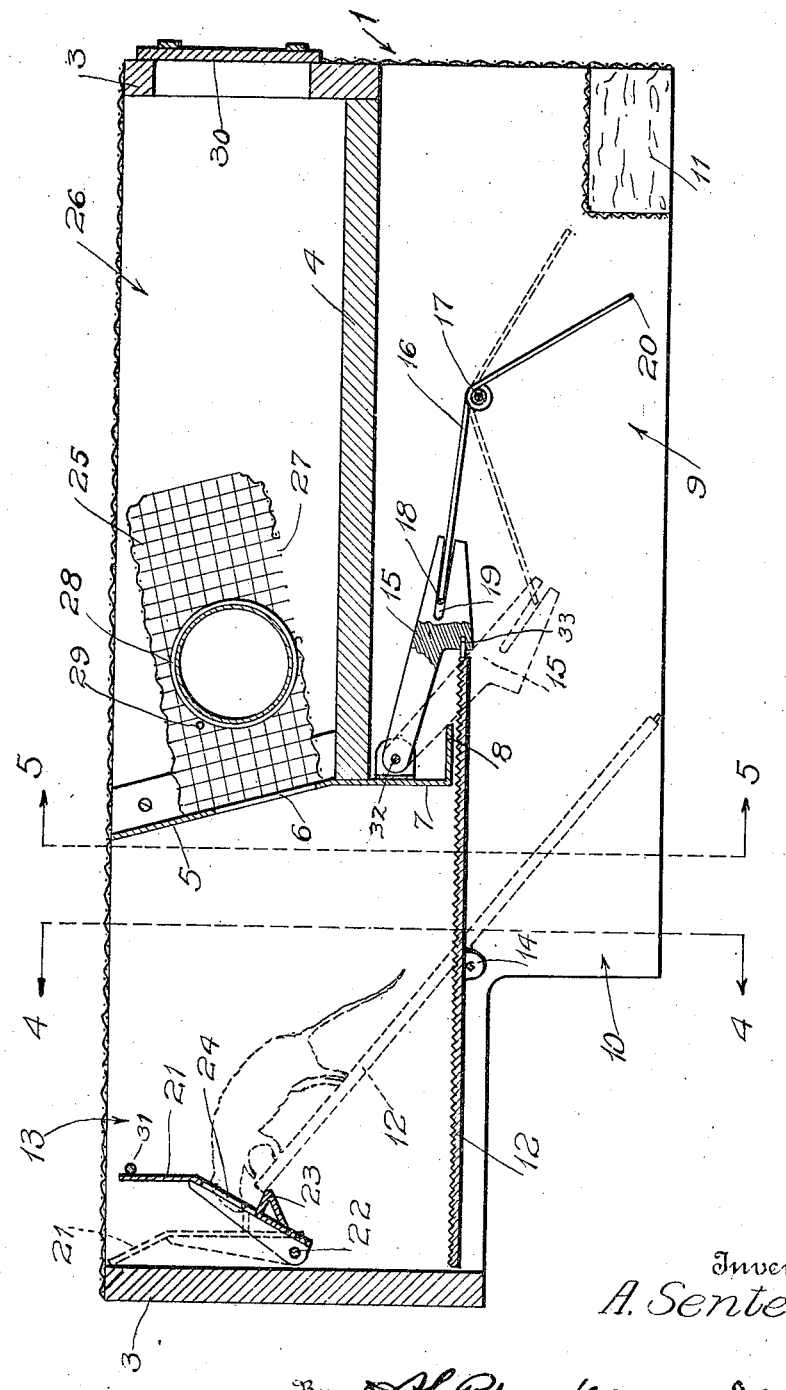

Mar. 13, 1923. 1,448,092.
A. SENTELL.
TRAP.
FILED DEC. 15, 1921. 3 SHEETS—SHEET 3.
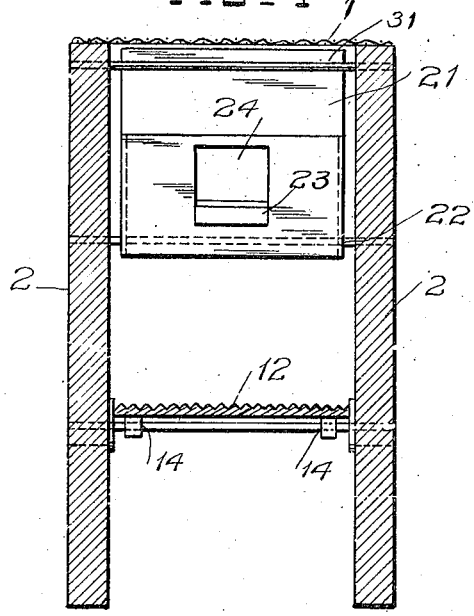
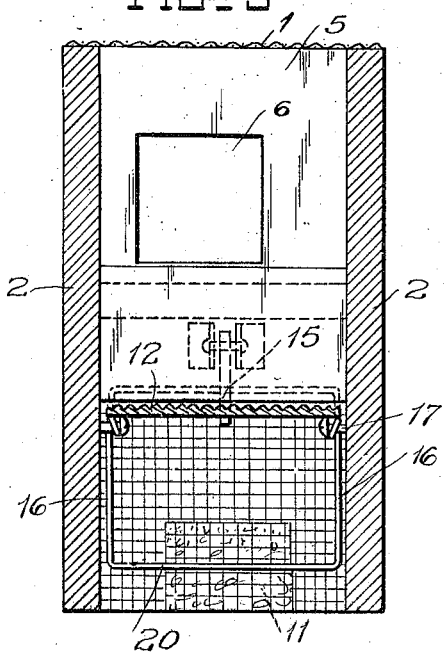
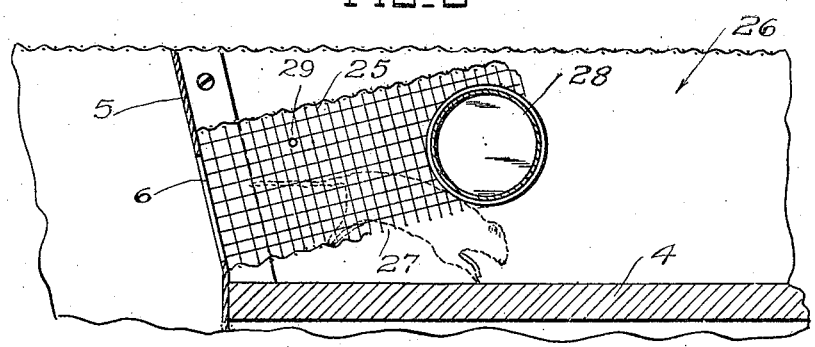
Inventor
A. Sentell
By H. R. Wilson &co.
Attorneys Patented Mar. 13, 1923.

1,448,092

UNITED STATES PATENT OFFICE.

ARTHUR SENTELL, OF PISGAH FOREST, NORTH CAROLINA.

TRAP.

Application filed December 15, 1921. Serial No. 522,520.

*To all whom it may concern:*

Be it known that I, ARTHUR SENTELL, a citizen of the United States, residing at Pisgah Forest, in the county of Transylvania and State of North Carolina, have invented certain new and useful Improvements in Traps; and I do declare the following to be a full, clear, and exact description of the invention, such as will enable others skilled in the art to which it appertains to make and use the same.

My invention relates to improvements in traps and the present disclosure is directed more particularly to a rat trap, although the invention may be constructed in any desired design and size for catching other kinds of animals and rodents.

The principal object of the invention is to provide a comparatively simple and inexpensive, yet a highly efficient and reliable trap which will be self-setting after each animal is trapped so as to be in readiness for catching another.

In carrying out the above end, a lower compartment is provided into which the animal is enticed by bait, and an upper compartment is used into which the animal is adapted to move from the lower compartment, and a further aim is to provide a single pivoted platform for closing the inlet of the entrance compartment after a rat or other animal has entered, for opening communication between the two compartments and for constituting a runway by means of which the animal may enter the upper compartment from the lower compartment.

The trapped animal in the upper compartment leaves the same and enters a cage, and a further aim is to provide a novel device for positively preventing the rat or the like from leaving this cage and again entering the upper compartment.

With the foregoing in view, the invention resides in the novel subject matter hereinafter described and claimed, the descriptive matter being supplemented by the accompanying drawings.

Figure 1 is a top plan view partly broken away.

Figure 2 is a bottom plan view.

Figure 3 is a central vertical longitudinal sectional view.

Figures 4 and 5 are vertical transverse sectional views as indicated by lines 4—4 and 5—5 of Fig. 3.

Figure 6 is a detail longitudinal sectional view similar to a portion of Fig. 3 but showing a different position of parts.

In the drawings above briefly described, the numeral 1 designates an elongated casing formed of metal, wire mesh or any other suitable material, but preferably provided with solid sides 2 and ends 3. Throughout a portion of its length, the casing 1 is divided by a horizontal partition 4 which extends from one of its ends to a point spaced from the other end, at which point it is secured to a vertical transverse partition 5 having an opening 6. The partition 5 preferably extends below the partition 4 to form a vertical wall 7 having a laterally extending flange 8 at its lower edge. The compartment 9 below the partition 4, is open at one end to form an inlet 10 through which the rat or the like may enter in an attempt to reach the bait 11, but in making this attempt, a trigger mechanism is released and thus permits a pivoted platform 12 to drop to the dotted line position of Fig. 3, so that it simultaneously closes the inlet 10 and opens up communication between the compartment 9 and the upper compartment 13 formed between the partition 5 and the adjacent end 3. The platform 12 is pivotally mounted between its ends as shown at 14 and due to the fact that one end is held in place as will be hereinafter explained normally lies horizontally to entirely close the lower side of the compartment 13, the other end resting against the flange 8 as shown in full lines in Fig. 3. A pivoted latch 15 is mounted on a standard 32 secured in the compartment 9, preferably on the wall 7 and engages the platform 12 to hold it in horizontal position, preferably by means of a common pin and socket connection 33 but the inner end of the platform is of such weight as to drop to the dotted line position as soon as the latch is released. Any suitable means may be employed for releasing latch 15, but I prefer to fulcrum a pair of angular levers 16 upon a rod 17 which extends across the compartment 9, the upper ends of said levers being connected by a rod 18 received in a slot 19 formed in the latch 15, while the lower ends of said levers are connected by a treadle or rod 20 positioned in advance of the bait 11. The animal entering the compartment 9 with the platform 12 latched in horizontal position, steps on the rod 20, in endeavoring to reach the bait, thereby rocking the levers 16 and raising the latch 15 so as to disengage the platform. The inner end of this platform then drops and closes the inlet 10 and the latch 15 falls to the dotted line position of Fig. 3.

To hold the platform 12 temporarily in an inclined position, a latch plate 21 is pivotally mounted at 22 in one end of the compartment 13, said plate having a nose 23 with which the upper end of the platform is self-engageable when said platform is tilted. The plate 21 normally rests against the stop 31 and is formed with an opening 24 of insufficient size to permit the trapped animal to pass therethrough, but as he runs up the platform 12, attempting to leave the trap, he endeavors to pass through said opening, the result being that the plate 21 is moved to the dotted line position of Fig. 3, thereby releasing the nose 23 and permitting the platform 12 to return to horizontal position under the weight of the trapped animal. When this takes place, the latch 15 is self-applicable to hold the platform and the levers 16 are again set in such position as to permit another rat or the like to trip them.

Failing to release itself from the compartment 13 through the opening 24, the trapped animal makes his way through the opening 6. This opening communicates with an open work passage member 25 which inclines from the partition 5 into the cage compartment 26 above the partition 4 and the lower side of said passage member is formed with an outlet opening 27 by means of which communication may be had with said compartment 26. Direct access to the opening 27, however, is prevented by a light metal roller 28 within the passage member 25 as shown in Fig. 3. The trapped animal, however, readily forces this roller up the incline as shown in Fig. 6 and thereby enters the compartment 26 through the opening 27. The roller 28 then returns to its initial position, being limited by suitable stops 29, preferably a wire rod mounted between the side walls 2 and 3, and it is absolutely impossible for the animal to again move this roller up the incline and thereby escape from the cage 26. This cage is provided with an appropriate door 30 by means of which the trapped animals may be removed.

From the foregoing, taken in connection with the accompanying drawings, it will be seen that I have provided an extremely simple, yet a highly efficient and reliable self-setting trap and since excellent results have been obtained from the details disclosed, they may well be followed. I wish it understood, however, that within the scope of the invention as claimed, the trap may be embodied in numerous forms other than that shown.

I claim:

1. In an animal trap, an upper compartment, a lower compartment and an intermediate compartment; a platform mounted between said lower and intermediate compartments, animal controlled means mounted in said lower compartment for holding said platform normally in position to close said intermediate compartment and leave free ingress to said lower compartment, said means releasing said platform to close said lower compartment and permit ingress to said intermediate compartment when animal actuated; means in said intermediate compartment for holding said platform in its second position, said means being adapted to be operated by an animal to release said platform to normal position, and an animal actuated passage member between said upper and intermediate compartments adapted to be moved to permit entrance to said upper compartment and to automatically prevent exit therefrom.

2. A trap comprising a lower compartment having an inlet, an upper compartment having an inlet leading from the upper portion of said lower compartment, a platform pivoted between its ends in said upper portion of the lower compartment and adapted when horizontal to close said inlet of the upper compartment but to close the inlet of the lower compartment when inclined, a latch pivotally mounted in said lower compartment and self-movable downwardly into engagement with said platform to hold it normally horizontal, a lever mounted in said lower compartment and connected at its upper end with said latch, the lower end of said lever having a treadle arm adapted to be depressed to release said latch, said platform being self-movable to inclined position when released, whereby to form a runway leading to the upper compartment, and self-acting animal-released means for holding said platform when moved to its inclined position.

3. A trap comprising a lower compartment having an inlet, an upper compartment having an inlet leading from the upper portion of said lower compartment, a platform pivoted between its ends in said upper portion of the lower compartment and adapted when horizontal to close said inlet of the upper compartment, but to close the inlet of the lower compartment when inclined, animal-released means for holding said platform when moved to horizontal position, said platform being self-movable to inclined position when released, whereby to form a runway leading to the upper compartment, and a plate pivoted in and extending across said upper compartment, said plate having a nose to engage said platform and hold it in inclined position until released, said plate being formed with an opening through which the entrapped animal endeavors to pass, whereby to release said nose.

4. The combination with a trap having two compartments and a communicating opening between them, of a passage member inclining from said opening into one of said compartments, said passage member having an outlet opening near the upper end of its bottom, and a roller in said passage member normally disposed between said communicating opening and said outlet opening and adapted to be rolled upwardly in said passage member by an entrapped animal, whereby to expose said outlet opening.

5. In an animal trap, a lower, an upper and an intermediate compartment, an inlet to said lower compartment, a swinging gate between said lower and intermediate compartments adapted to close said inlet and provide a passage to said intermediate compartment, means for holding said gate normally to open said inlet, animal actuated means for releasing said holding means and permitting said gate to automatically close; means for holding said gate in closed position, said last mentioned means being animal operated to again permit said gate to move to position, a passage member between said intermediate and upper compartments, an outlet in said passage member to said upper compartment, and means in said passage member normally closing said outlet and adapted to be moved by an entrapped animal to permit entrance to said upper compartment.

In testimony whereof I have hereunto set my hand.

ARTHUR SENTELL.